US012701089B2

(12) United States Patent　　　　(10) Patent No.:　US 12,701,089 B2
Ellegaard　　　　　　　　　　　　　　(45) Date of Patent:　　　Aug. 4, 2026

(54) PROVIDING FRAMES AT A NETWORK PORT

(71) Applicant: Microchip Technology Incorporated, Chandler, AZ (US)

(72) Inventor: Lars Ellegaard, Copenhagen S (DK)

(73) Assignee: Microchip Technology Incorporated, Chandler, AZ (US)

( * ) Notice: Subject to any disclaimer, the term of this patent is extended or adjusted under 35 U.S.C. 154(b) by 499 days.

(21) Appl. No.: 17/812,390

(22) Filed: Jul. 13, 2022

(65) Prior Publication Data

US 2023/0125743 A1　　Apr. 27, 2023

Related U.S. Application Data

(60) Provisional application No. 63/262,960, filed on Oct. 22, 2021.

(51) Int. Cl.
　H04L 12/403　　　(2006.01)
　H04L 49/104　　　(2022.01)
　H04L 49/253　　　(2022.01)

(52) U.S. Cl.
　CPC .......... H04L 49/253 (2013.01); H04L 49/104 (2013.01)

(58) Field of Classification Search
　CPC ............ G05B 19/41855; H04L 49/104; H04L 49/253; H04Q 2209/30; H04Q 2209/82; H04Q 2209/845; H04Q 9/00
　See application file for complete search history.

(56) References Cited

U.S. PATENT DOCUMENTS

| | | | | |
|---|---|---|---|---|
| 5,784,374 | A * | 7/1998 | Runaldue ............ | H04L 12/5601 |
| | | | | 370/414 |
| 6,931,002 | B1 * | 8/2005 | Simpkins .............. | H04L 49/108 |
| | | | | 370/374 |
| 7,082,132 | B1 * | 7/2006 | Beshai ................. | H04Q 3/5455 |
| | | | | 370/386 |
| 10,009,252 | B2 * | 6/2018 | Liu ......................... | H04L 45/74 |
| 10,075,393 | B2 * | 9/2018 | Pham .................... | H04L 41/342 |
| 11,985,671 | B2 * | 5/2024 | Huang .................. | H04W 72/23 |
| 2004/0064559 | A1 * | 4/2004 | Kupst ................. | H04L 61/5007 |
| | | | | 709/245 |
| 2006/0104267 | A1 * | 5/2006 | Mondinelli ............. | H04L 45/04 |
| | | | | 370/389 |
| 2007/0002889 | A1 * | 1/2007 | Sekhar .................. | H04W 40/00 |
| | | | | 370/328 |

(Continued)

OTHER PUBLICATIONS

International Search Report for International Application No. PCT/US2022/073698, mailed Nov. 7, 2022, 6 pages.

(Continued)

*Primary Examiner* — Phuc H Tran
(74) *Attorney, Agent, or Firm* — TraskBritt

(57) ABSTRACT

Examples disclosed herein relate generally to providing frames at a network port. Some examples relate to an apparatus. The apparatus may include a network port to directly couple the apparatus to a switch. The apparatus may also include a transmission logic to provide a frame at the network port at a time slot of a switch-associated cycle time. The transmission logic may provide the frame at the time slot at least partially responsive to an offset value and a port number. Related devices, systems and methods are also disclosed.

18 Claims, 9 Drawing Sheets

(56) References Cited

U.S. PATENT DOCUMENTS

| | | | | |
|---|---|---|---|---|
| 2008/0199158 | A1* | 8/2008 | Nakagawa | H04N 21/232 |
| | | | | 386/326 |
| 2013/0222123 | A1* | 8/2013 | Wessling | G05B 19/0423 |
| | | | | 340/12.22 |
| 2014/0010270 | A1* | 1/2014 | Shi | H04M 11/062 |
| | | | | 375/222 |
| 2015/0341179 | A1 | 11/2015 | Butler et al. | |
| 2017/0163366 | A1* | 6/2017 | Aichriedler | H04L 12/403 |
| 2019/0219996 | A1 | 7/2019 | Cella et al. | |
| 2022/0191893 | A1* | 6/2022 | Miao | H04W 72/20 |
| 2023/0291520 | A1* | 9/2023 | Iwai | H04L 5/0094 |

OTHER PUBLICATIONS

International Written Opinion for International Application No. PCT/US2022/073698, mailed Nov. 7, 2022, 9 pages.
Office Action and Search Report of Taiwan Patent Application No. 111139752, mailed Jan. 12, 2026, 22 pages with English translation.

* cited by examiner

PROVIDING FRAMES AT A NETWORK PORT

CROSS-REFERENCE TO RELATED APPLICATION

This application claims the benefit of the priority date of U.S. Provisional Patent Application No. 63/262,960, filed Oct. 22, 2021, and titled "ASSIGNING TRANSMISSION TIME SLOTS TO DEVICES PHYSICALLY CONNECTED TO A SWITCH," the disclosure of which is incorporated herein in its entirety by this reference.

FIELD

This description relates, generally, to timing of network communications. More specifically, some examples relate to determining a time at which to provide a frame at a network port, without limitation.

BACKGROUND

In a control network a controller may receive sense data from sensors and provide control data to actuators. Some control networks include switches between controllers and sensors or actuators. Some control networks include controllers, sensors, or actuators that operate asynchronously, for example, without timing coordination.

BRIEF DESCRIPTION OF THE DRAWINGS

While this disclosure concludes with claims particularly pointing out and distinctly claiming specific examples, various features and advantages of examples within the scope of this disclosure may be more readily ascertained from the following description when read in conjunction with the accompanying drawings, in which:

DETAILED DESCRIPTION

Figure 1:
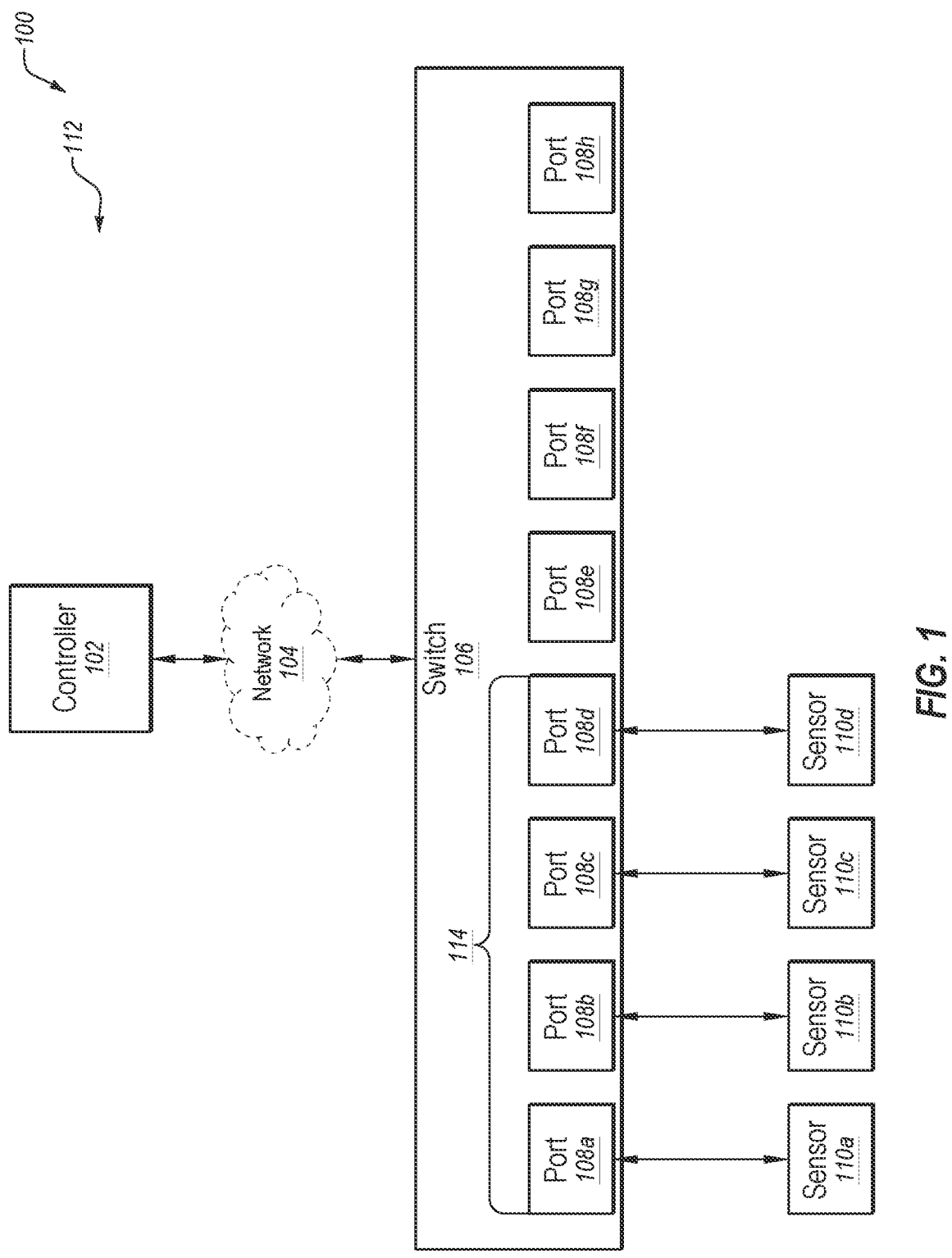
FIG. 1 is a functional block diagram illustrating a system according to one or more examples.

In the following detailed description, reference is made to the accompanying drawings, which form a part hereof, and in which are shown, by way of illustration, specific examples in which the present disclosure may be practiced. These examples are described in sufficient detail to enable a person of ordinary skill in the art to practice the present disclosure. However, other examples may be utilized, and structural, material, and process changes may be made without departing from the scope of the disclosure.

The illustrations presented herein are not meant to be actual views of any particular method, system, device, or structure, but are merely idealized representations that are employed to describe the examples of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

The following description may include examples to help enable one of ordinary skill in the art to practice the disclosed examples. The use of the terms "exemplary," "by example," and "for example," means that the related description is explanatory, and though the scope of the disclosure is intended to encompass the examples and legal equivalents, the use of such terms is not intended to limit the scope of an example of this disclosure to the specified components, steps, features, functions, or the like.

It will be readily understood that the components of the examples as generally described herein and illustrated in the drawing could be arranged and designed in a wide variety of different configurations. Thus, the following description of various examples is not intended to limit the scope of the present disclosure, but is merely representative of various examples. While the various aspects of the examples may be presented in drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be depicted by block diagram form in order not to obscure the present disclosure in unnecessary detail. Conversely, specific implementations shown and described are only examples and should not be construed as the only way to implement the present disclosure unless specified otherwise herein. Additionally, block definitions and partitioning of logic between various blocks is an example of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. For example, data, instructions, commands, information, signals, bits, and symbols that may be referenced throughout this description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal. A person having ordinary skill in the art would appreciate that this disclosure encompasses communication of quantum information and qubits used to represent quantum information.

The various illustrative logical blocks, modules, and circuits described in connection with the examples disclosed herein may be implemented or performed with a general purpose processor, a special purpose processor, a Digital Signal Processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer executes computing instructions (e.g., software code, without limitation) related to examples of the present disclosure.

The examples may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, or a subprogram, without limitation. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

One or more examples may be used in an asynchronous control network. As a non-limiting example, in an asynchronous control network, sensors may operate asynchronously, i.e., not according to a timing of other elements of the network. As a non-limiting example, sensors may generate sense data and may provide frames including, or representative of, the sense data at any time and not according to timing of other elements of the network. As a non-limiting example, a sensor may operate according to a device cycle time of the sensor independent of operation of other devices of the network. As an alternative example, a sensor may operate not according to any timing.

In an asynchronous control network, including many asynchronously operating sensors, there is a possibility that more than one of the asynchronously operating sensors may provide frames to the same switch (e.g., a switch of the network) at the same time, or while the switch is busy receiving or transmitting another frame. The switch may store one or more incoming frames in a buffer while outgoing frames are provided at an output port. In order to guarantee that no incoming frames will be dropped, a switch would need a buffer that is at least as large as one frame from each asynchronously operating sensor to which the switch is to be directly coupled. Further, such a switch may be coupled to one or more additional switches and may receive frames from the one or more other switches (which frames may carry data from one or more other sensors) which may place further demands on the size of the buffer of the switch. Thus, designing a network to guarantee service to asynchronously operating sensors may utilize complicated design or switches including large buffers, which may be expensive.

One or more examples may allow one or more asynchronously operating sensors to provide frames to a network switch according to respective time slots of a determined switch-associated cycle time (e.g., a "switch-associated cycle time") such that the one or more asynchronously operating sensors do not provide frames at the same time. Such examples may allow networks to be simpler to design or less expensive than other networks.

One or more examples relate generally to timing of network communications. As a non-limiting example, one or more examples relate to an apparatus (e.g., a sensor, without limitation) that provides frames at a same time slot each switch-associated cycle time. Other apparatuses may provide frames at other time slots of the switch-associated cycle time. As a non-limiting example, a first apparatus may provide frames at a first time slot each switch-associated cycle time. A second apparatus may provide frames at a second time slot each switch-associated cycle time.

In various non-limiting examples, an apparatus may determine when to provide frames, for example, in contrast to the apparatus being instructed when to provide frames, e.g., by a controller, without limitation. As a non-limiting example, an apparatus may determine a time slot of a switch-associated cycle time during which to provide frames. Continuing the example above, the first apparatus may determine to provide frames at the first time slot of the switch-associated cycle time and the second apparatus may determine to provide frames at the second time slot of the switch-associated cycle time.

The apparatus may determine when to provide the frames at least partially responsive to an offset value. The offset value may be a fraction of the switch-associated cycle time. The offset value may be the switch-associated cycle time divided by a number of ports (e.g., used ports or total ports) of a switch to which the apparatus providing the frames is directly coupled. As a non-limiting example, a switch may be directly coupled to eight apparatuses, i.e., the switch may have eight used ports. One of the devices directly coupled to the switch may have a device cycle time of 8 milliseconds (ms). The 8 ms device cycle time may be the shortest device cycle time of the device cycle times of the devices directly coupled to the switch. The 8 ms device cycle time may be selected as the switch-associated cycle time. Thus, the offset value may be one ms (i.e., eight ms (the switch-associated cycle time) divided by eight (the number of used ports)).

The apparatus may determine when to provide the frames at least partially responsive to a port number. The port number may be a number of a port of a switch to which the apparatus providing the frame is directly coupled. As a non-limiting example, a switch may have a first port directly coupled to a first apparatus and a second port directly coupled to a second apparatus. The first apparatus may determine to provide frames during a first time slot based on a first port number of the first port and the second apparatus may determine to provide frames during a second time slot based on the second port number of the second port.

The apparatus may determine when to provide the frames at least partially responsive to a product of the offset value and a number based on the port number. As a non-limiting example, the apparatus may determine when to provide the frames at least partially responsive to a product of the offset value and the port number (or a number one less than the port number).

As a non-limiting example of contemplated operations of a system according to one or more examples, a controller may be communicatively coupled to a switch. The controller may be further communicatively coupled to one or more apparatuses (e.g., sensors, without limitation) through the switch. Each of the one or more apparatuses may generate and/or provide frames to the switch according to a respective device cycle. The controller may determine a switch-associated cycle time for the switch. The switch-associated cycle time may correspond to a device cycle. For example, the switch-associated cycle time may be the shortest device cycle of all the device cycles of the one or more apparatus coupled to the switch. The controller may determine a number of ports (e.g., used ports or total ports) of the switch (e.g., based on a setting of the controller or the network, or based on a switch discovery protocol, without limitation). The controller may determine an offset value, for example, the switch-associated cycle time divided by the number of ports. The controller may provide the offset value to the one or more apparatuses.

Continuing the non-limiting example of contemplated operations, the switch may provide a port number to each of the apparatuses to which it is directly coupled. As a non-limiting example, the switch may provide a first number of a first port to a first apparatus directly coupled to the first port and a second number of a second port to a second apparatus directly coupled to the second port.

Continuing the non-limiting example of contemplated operations, the one or more apparatuses may respectively determine a respective time slot of the switch-associated cycle time during which to provide frames. The apparatuses may determine their respective time slots at least partially responsive to the offset value and to a number related to the port number. As a non-limiting example, the time slot may be the offset value multiplied by the port number (or the port number minus one). As a non-limiting example, a first apparatus, having received an offset value of one ms, and a port number of "1," may determine that a time slot of the first apparatus is zero ms, for example, one ms times the result of port number ("1") minus one. A second apparatus, having received an offset value of one ms, and a port number of "2," may determine that a time slot of the first apparatus is one ms, for example, one ms times the result of port number ("2") minus one. Thus, the first apparatus may provide frames every switch-associated cycle time zero ms after the beginning of the switch-associated cycle time (e.g., at the beginning of the switch-associated cycle time, without limitation) and the second apparatus may provide frames every switch-associated cycle time one ms after the beginning of the switch-associated cycle time.

The apparatuses may be asynchronously operating sensors which may generate sense data at any time and not according to a timing of other apparatuses (e.g., sensors). The apparatuses may buffer data between switch-associated cycle times for sending during each of their respective time slots.

FIG. 1 is a functional block diagram illustrating a system 100 according to one or more examples. System 100, or various elements thereof, may operate such that sensors 110 may provide frames at time slots that do not overlap one with another.

System 100 includes a controller 102, a switch 106 having ports 108, (port 108a, port 108b, port 108c, port 108d, port 108e, port 108f, and port 108g may be referred to collectively as "ports 108"), and sensors 110 (sensor 110a, sensor 110b, sensor 110c, and sensor 110d may be referred to collectively as "sensors 110"). System 100 may or may not include a network 104, in other words, network 104 is optional in system 100. The optionality of network 104 in system 100 is indicated by network 104 being illustrated using dashed lines.

Controller 102 may be, or may include, any suitable logic or processor for controlling performance of operations in system 100 or for receiving sense data from sensors 110 of system 100. In some examples, controller 102 may be, or may include, a programmable logic controller (PLC) or a processor.

Network 104 may be, or may include, a communication network, i.e., network 104, through which controller 102 can send data or receive sense data, for example, from sensors 110. Network 104 may include one or more switches, bridges, and network cables and the like. Network 104 may function according to Ethernet protocols, in other words, network 104 may be an Ethernet network, without limitation.

Switch 106 may be, or may include, any suitable switch for facilitating communication between controller 102 and sensors 110. Switch 106 may function according to Ethernet protocols, in other words, switch 106 may be an Ethernet switch, without limitation.

Sensors 110 may sense (or measure) one or more properties. Sensors 110 may generate sense data based on the sensed properties. Sensors 110 may generate frames including or representing the sense data. Sensors 110 may provide (e.g., transmit, without limitation) the frames to controller 102 (e.g., through switch 106, and optional network 104, without limitation). Non-limiting examples of suitable sensors include: acoustic sensors, chemical sensors, electric sensors, magnetic sensors, radiation sensors, fluid sensors, position sensors, displacement sensors, speed sensors, optical sensors, pressure sensors, force sensors, weight sensors, thermal sensors, or combinations thereof. System 100 may include any number of sensors 110. In FIG. 1, four sensors 110 are illustrated for illustrative purposes.

Sensors 110 may operate asynchronously, in other words, sensors 110 may sense properties or generate frames (e.g., including sense data representing the sensed properties, without limitation) not according to timing of other devices of network 104 or others of sensors 110. In one example, the sensors 110 respectively sense properties or generate frames periodically, according to a respective device cycle. Because sensors 110 may operate asynchronously, system 100 may be an asynchronous control network 112.

System 100 may include additional switches directly coupled to switch 106, additional switches coupled to network 104, additional sensors directly coupled to the additional switches, or additional actuators directly coupled to switch 106 or to the additional switches, all of which are omitted from FIG. 1 for illustrative purposes.

Ports 108 may be interfaces for communication between switch 106 and respective sensors 110. Ports 108 may be wired or may function according to Ethernet protocols, in other words, ports 108 may be Ethernet ports, without limitation. Switch 106 may include additional ports (not illustrated in FIG. 1 for illustrative purposes). One or more of the additional ports may be directly coupled to one or more respective additional switches (not illustrated in FIG. 1 for illustrative purposes).

According to the example illustrated in FIG. 1, four of ports 108 (i.e., port 108a, port 108b, port 108c, and port 108d) are directly coupled to sensors 110 (i.e., sensor 110a, sensor 110*b*, sensor 110*c*, and sensor 110*d* respectively). Thus, four of ports 108 are "used." In other words, switch 106 includes four used ports 114. Switch 106 may include any number of ports 108. In FIG. 1, eight ports 108 are illustrated for illustrative purposes. According to the example illustrated in FIG. 1, switch 106 includes eight total ports (i.e., port 108*a*, port 108*b*, port 108*c*, port 108*d*, port 108*e*, port 108*f*, port 108*g*, and port 108*h*).

Ports 108 may be numbered. In various non-limiting examples, ports 108 may be numbered from zero to a total number of ports minus one. In other examples, ports 108 may be numbered from one to the total number of ports. In some examples, ports 108 may be numbered according to a number of used ports, for example, from a first used port to a last used port, skipping any unused ports. In other examples, ports may be numbered according to a number of total ports, for example, from a first port to a last port without skipping any unused ports. In various non-limiting examples, additional ports may, or may not, be numbered including, as a non-limiting example, ports (not illustrated) communicatively coupled to other elements of network 104 (e.g., other switches, without limitation) or a port (not illustrated) communicatively coupled to controller 102.

As a non-limiting example of contemplated operations of system 100, controller 102 may determine a switch-associated cycle time, which may correspond to a device cycle time. For example, controller 102 may select the shortest of the one or more device cycles of the sensors 110 as the switch-associated cycle time.

Continuing the non-limiting example of contemplated operations, controller 102 may determine a number of ports 114 (e.g., a number of used ports or a number of total ports) of switch 106, e.g., based on a setting of controller 102 or network 104, or based on a switch discovery protocol, without limitation. Controller 102 may determine an offset value, which may be the switch-associated cycle time (e.g., the shortest device cycle of the device cycles of sensors 110) divided by the number of ports 114. Controller 102 may provide the offset value to sensors 110 (through switch 106, and optionally through network 104). As a non-limiting example, the switch-associated cycle time may be eight ms. In such a case, with four ports 114, i.e., the number of used ports, the offset value may be two ms. Alternatively, in some non-limiting examples, controller 102 may determine the offset value based on the switch-associated cycle time divided by a number of total ports of the switch. In such a case, with a switch-associated cycle time of eight ms and a switch having eight total ports, the offset value may be one ms.

Continuing the non-limiting example of contemplated operations, switch 106 may provide a respective port number to each of sensors 110. As a non-limiting example, switch 106 may provide a port number "1" to sensor 110*a* at port 108*a*, a port number "2" to sensor 110*b* at port 108*b*, a port number "3" to sensor 110*c* at port 108*c*, and a port number "4" to sensor 110*d* at port 108*d*.

Continuing the non-limiting example of contemplated operations, each of sensors 110 may determine a respective time slot of the switch-associated cycle time during which to provide frames. Sensors 110 may determine the respective times slots at least partially responsive to the provided offset value and a number related to the provided port number. As a non-limiting example, respective sensors 110 may determine to provide frames to switch 106 at a time based on the provided offset value multiplied by the provided port number or the provided offset value multiplied by the result of the provided port number minus one. Additionally, respective sensors 110 may determine when during a switch-associated cycle time to provide frames based on settings of the sensor 110. As a non-limiting example, sensors 110 may be configured such that a sensor 110*a*, coupled to the first port 108*a*, having received a port number 1 and an offset value of 1 ms, may provide frames at zero ms offset i.e., at the beginning of the switch-associated cycle time. Alternatively, the sensor 110*a*, coupled to the first port 108*a*, having received a port number 1 and an offset value of 1 ms, may be configured to provide frames at one offset value after the beginning of a switch-associated cycle time. In such a case, the last sensor (e.g., sensor 110*d*) may provide frames at zero ms offset.

As a non-limiting example, sensor 110*a* may determine to provide frames at the beginning of every switch-associated cycle time, for example, based on the offset value (two ms) (received from controller 102) multiplied by the result of the port number "1" (that sensor 110*a* received from switch 106) minus one. Similarly sensor 110*b* may determine to provide frames two ms after the beginning of each switch-associated cycle time, for example, based on the offset value (two ms) (received from controller 102) multiplied by the result of the port number "2" (that sensor 110*b* received from switch 106) minus one. Similarly sensor 110*c* may determine to provide frames four ms after the beginning of each switch-associated cycle time, for example, based on the offset value (two ms) (received from controller 102) multiplied by the result of the port number "3" (that sensor 110*c* received from switch 106) minus one. Similarly sensor 110*d* may determine to provide frames six ms after the beginning of each switch-associated cycle time, for example, based on the offset value (two ms) (received from controller 102) multiplied by the result of the port number "4" (that sensor 110*d* received from switch 106) minus one.

As another non-limiting example, sensor 110*a* may determine to provide frames at the beginning of every switch-associated cycle time, for example, based on the offset value (two ms) (received from controller 102) multiplied by the port number "0" (that sensor 110*a* received from switch 106). Similarly sensor 110*b* may determine to provide frames two ms after the beginning of each switch-associated cycle time, for example, based on the offset value (two ms) (received from controller 102) multiplied by the port number "1" (that sensor 110*b* received from switch 106). Similarly sensor 110*c* may determine to provide frames four ms after the beginning of each switch-associated cycle time, for example, based on the offset value (two ms) (received from controller 102) multiplied by the port number "2" (that sensor 110*c* received from switch 106). Similarly sensor 110*d* may determine to provide frames six ms after the beginning of each switch-associated cycle time, for example, based on the offset value (two ms) (received from controller 102) multiplied by the port number "3" (that sensor 110*d* received from switch 106).

As yet another non-limiting example, sensor 110*a* may determine to provide frames a predetermined offset value, described without limitation as one offset value (two ms) after the beginning of every switch-associated cycle time. For example, based on the offset value (two ms) (received from controller 102) multiplied by the result of the port number "1" (that sensor 110*a* received from switch 106) minus one, adjusted by a setting at sensor 110*a* indicating that the first port number corresponds to an offset value of one. Similarly sensor 110*b* may determine to provide frames four ms after the beginning of each switch-associated cycle time, for example, based on the offset value (two ms) (received from controller 102) multiplied by the result of the port number "2" (that sensor 110*b* received from switch 106) minus one, adjusted by a setting at sensor 110*b* indicating that the first port number corresponds to an offset value of one. Similarly sensor 110*c* may determine to provide frames six ms after the beginning of each switch-associated cycle time, for example, based on the offset value (two ms) (received from controller 102) multiplied by the result of the port number "3" (that sensor 110*c* received from switch 106) minus one, adjusted by a setting at sensor 110*c* indicating that the first port number corresponds to an offset value of one. Similarly sensor 110*d* may determine to provide frames eight ms after the beginning of each switch-associated cycle time (which may correspond to the beginning of a subsequent switch-associated cycle time), for example, based on the offset value (two ms) (received from controller 102) multiplied by the result of the port number "4" (that sensor 110*d* received from switch 106) minus one, adjusted by a setting at sensor 110*d* indicating that the first port number corresponds to an offset value of one.

As yet another non-limiting example, sensor 110*a* may determine to provide frames one offset value (two ms) after the beginning of every switch-associated cycle time, for example, based on the offset value (two ms) (received from controller 102) multiplied by the port number "0" (that sensor 110*a* received from switch 106), adjusted by a setting at sensor 110*a* indicating that the first port number corresponds to an offset value of one. Similarly sensor 110*b* may determine to provide frames four ms after the beginning of each switch-associated cycle time, for example, based on the offset value (two ms) (received from controller 102) multiplied by the port number "1" (that sensor 110*b* received from switch 106), adjusted by a setting at sensor 110*b* indicating that the first port number corresponds to an offset value of one. Similarly sensor 110*c* may determine to provide frames six ms after the beginning of each switch-associated cycle time, for example, based on the offset value (two ms) (received from controller 102) multiplied by the port number "2" (that sensor 110*c* received from switch 106), adjusted by a setting at sensor 110*c* indicating that the first port number corresponds to an offset value of one. Similarly sensor 110*d* may determine to provide frames eight ms after the beginning of each switch-associated cycle time (which may correspond to the beginning of a subsequent switch-associated cycle time), for example, based on the offset value (two ms) (received from controller 102) multiplied by the port number "3" (that sensor 110*d* received from switch 106), adjusted by a setting at sensor 110*d* indicating that the first port number corresponds to an offset value of one.

Continuing the non-limiting example of contemplated operations, controller 102 may transmit a timing signal to sensors 110 via switch 106, and optionally through network 104. Sensors 110 may include respective counters to count clock cycles. Sensors 110 may synchronize their respective counters according to the timing signal. Sensors 110 may track a time elapsed since receipt of the timing signal and determine when to send frames according to the tracked time and the time slots.

Continuing the non-limiting example of contemplated operations, sensors 110 may operate asynchronously to generate sense data at any time and not according to a schedule. Each of sensors 110 may buffer sense data between switch-associated cycle times and provide frames including, or representative of, the sense data at its respective determined time slot each switch-associated cycle time.

As described above, controller 102 may evenly divide the switch-associated cycle time between sensors 110. In other words, each of sensors 110 may have a fraction of the switch-associated cycle time during which to provide frames.

Figure 2:
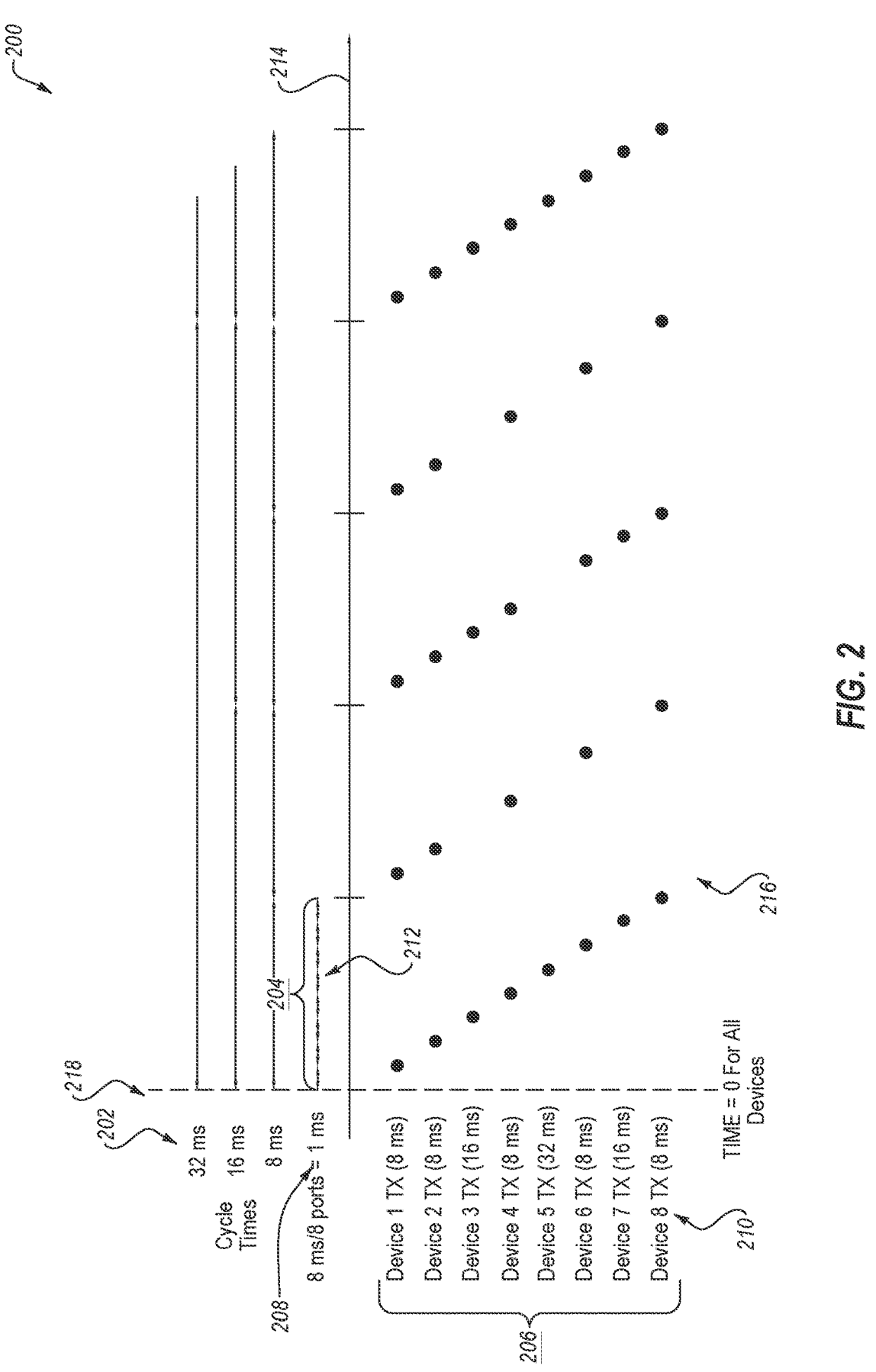
FIG. 2 illustrates a timing diagram according to one or more examples.

FIG. 2 illustrates a timing diagram 200 according to one or more examples. Timing diagram 200 illustrates various examples related to operation of a system (e.g., system 100 of FIG. 1, without limitation) including a controller (e.g., a controller, e.g., controller 102 of FIG. 1, without limitation), a switch (e.g., a switch, e.g., switch 106 of FIG. 1, without limitation), and one or more other devices (e.g., one or more sensors, e.g., sensors 110 of FIG. 1, without limitation).

Illustrated in FIG. 2, are representations of: device cycle 202 times, a switch-associated cycle time 204, used ports 206, an offset value 208, port numbers 210, time slots 212, frame transmissions 216 and time zero 218. Device cycles 202, switch-associated cycle time 204, time slots 212, frame transmissions 216, and time zero 218 are illustrated relative to a time axis 214.

Timing diagram 200 illustrates three example device cycles 202, i.e., a device cycle of 32 ms, a device cycle of 16 ms, and a device cycle of 8 ms. Device cycles 202 may be a periodicity of the device, e.g., a regularity at which a sensor generates and/or provides a frame.

The controller according to one or more examples, may select a switch-associated cycle time 204. Switch-associated cycle time 204 may be selected to be the shortest of device cycles 202 for devices connected to the respective switch.

The controller, according to one or more examples, may determine a number of ports 206 (e.g., used ports 114 of FIG. 1 or total ports, without limitation) of the switch. As a non-limiting example, the controller may determine the number of ports 206 according to a setting of the controller, a setting of a network, or a switch discovery protocol.

The controller, according to one or more examples, may determine an offset value 208 based on the switch-associated cycle time 204 and the number of ports 206. As a non-limiting example, offset value 208 may be switch-associated cycle time 204 divided by the number of ports 206. The controller may provide offset value 208 to one or more other devices (e.g., one or more sensors, without limitation).

The switch may determine port numbers 210 for each of the devices (e.g., sensors, without limitation) to which it is coupled. The switch may provide port numbers 210 to the one or more other devices.

The one or more other devices (e.g., sensors, without limitation) may determine a respective time slot of time slots 212 to use each switch-associated cycle time 204. Respective ones of the one or more other devices may determine their respective time slots based on offset value 208 and their respective port numbers 210. As a non-limiting example, a time slot may be based on a product of the received offset value 208 and a number based on the received port numbers 210. As a non-limiting example, "device 1 TX" may have received offset value 208 of 1 ms and a port number of "1." "Device 1 TX" may determine to provide frames 1 ms after the start of each switch-associated cycle time according to its determined time slot. Further, "device 2 TX" may have received offset value 208 of 1 ms and a port number of "2." "Device 2 TX" may determine to provide frames 2 ms after the start of each switch-associated cycle time according to its determined time slot.

Respective ones of the one or more other devices may provide frames during their respective time slots. As a non-limiting example, "device 1 TX" may provide frames one ms after the beginning of each switch-associated cycle time and "device 2 TX" may provide frames two ms after the beginning of each switch-associated cycle time. Frame transmissions 216 illustrates times at which devices provide packets as dots aligned with devices along the y-axis and arranged in time according to time axis 214.

Some of the one or more of other devices may not provide a frame according to the shortest device cycle, (which shortest device cycle may be selected as the switch-associated cycle time). As a non-limiting example, "device 1 TX" may provide frames every switch-associated cycle time (e.g., according to an 8 ms device cycle used by device 1 TX), "device 3 TX" may provide frames every other switch-associated cycle time (e.g., according to a 16 ms device cycle used by device 3 TX), and "device 5 TX" may provide frames every fourth switch-associated cycle time (e.g., according to a 32 ms device cycle used by device 5 TX).

The one or more devices may be asynchronously operating sensors. The one or more devices may generate sense data at any time during a switch-associated cycle time, yet, according to one or more examples the one or more devices may provide frames during their determined time slots. As a non-limiting example, "Device 3 TX" may generate sense data, and/or a frame, on average, every 16 ms. "Device 3 TX," according to one or more examples, may provide the frames only during its determined time slot. In such examples, "device 3 TX" may delay generating a frame until its determined time slot or hold a generated frame until its determined time slot.

The controller, according to one or more examples, may determine time zero 218 and may provide a timing signal indicative of time zero 218 to respective ones of the one or more other devices (e.g., sensors, without limitation). Respective ones of the other one or more other devices may synchronize an internal clock or counter according to time zero 218 such that the one or more other devices may provide their respective frames responsive to common time zero 218.

The one or more other devices may be asynchronously operating sensors, that is, the one or more other devices may sense properties independent of schedules or timings of other devices. Nevertheless, the one or more other devices may, according to one or more examples, generate or provide frames according to a timing or schedule (e.g., at respective times slots of a switch-associated cycle time, without limitation). Further, the one or more other devices may, according to one or more examples, include an internal counter that may be synchronized responsive to a timing signal of a controller, without limitation. Thus, while the devices may operate asynchronously, frames provided by the devices to the network may be regular and may be scheduled not to conflict with other frames from other devices (e.g., other devices directly coupled to the same switch).

Figure 3:
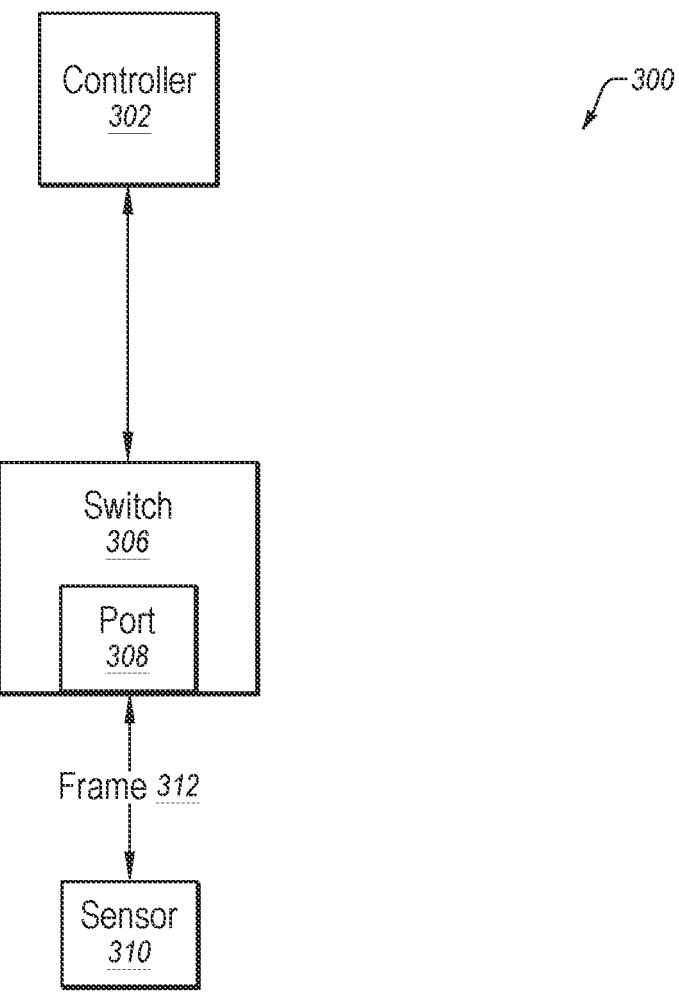
FIG. 3 is a functional block diagram illustrating a system according to one or more examples.

FIG. 3 is a functional block diagram illustrating a system 300 according to one or more examples. System 300, or various elements thereof, may operate such that sensors may provide frames at time slots that do not overlap one with another.

System 300 may include a controller 302 and a first switch 306, which first switch 306 may be communicatively coupled to controller 302. First switch 306 may include a first port 308. System 300 may include a first sensor 310, which first sensor 310 may be communicatively coupled to first port 308 of first switch 306. First sensor 310 may provide a first frame 312 to first switch 306 at a first time slot of a first switch-associated cycle time. The first time slot may be at least partially responsive to an offset value and a first port number provided to first sensor 310.

System 300 may be an example of system 100 of FIG. 1. Controller 302 may be the same as, or substantially similar to, controller 102 of FIG. 1. Switch 306 may be the same as, or substantially similar to, switch 106 of FIG. 1. Port 308 may be the same as, or substantially similar to, one of ports 108 of FIG. 1. Sensor 310 may be the same as, or substantially similar to, one of sensors 110 of FIG. 1.

The offset value may be a duration of the switch-associated cycle time divided by a number of used ports of switch 306. Controller 302 may provide the offset value to sensor 310.

The first port number may be a number of port 308. Switch 306 may provide the first port number to sensor 310.

In various non-limiting examples, sensor 310 may determine the time slot based on the first offset value and the first port number. As a non-limiting example, the time slot may be determined based on a product of the first offset value and a number based on the first port number.

Figure 4:
FIG. 4 is a functional block diagram illustrating a system according to one or more examples.

FIG. 4 is a functional block diagram illustrating a system 400 according to one or more examples. System 400, or various elements thereof, may operate such that sensors 410 may provide frames at time slots that do not overlap one with another.

System 400 may include a controller 402, a first switch 406a, and a second switch 406b, which first switch 406a may be communicatively coupled to controller 402, optionally through a network 404, and which second switch 406b may be communicatively coupled to controller 402, optionally through the network 404. First switch 406a may include a first port 408a, a second port 408b, a third port 408c and a fourth port 408d. Second switch 406b may include a fifth port 408e and a sixth port 408f. System 400 may include a first sensor 410a, which first sensor 410a may be communicatively coupled to first port 408a of first switch 406a. First sensor 410a may provide a first frame 412a to first switch 406a at a first time slot of a first switch-associated cycle time. The first time slot may be at least partially responsive to a first offset value and a first port number.

System 400 may be an example of system 100 of FIG. 1 or system 300 of FIG. 3. Controller 402 may be an example of controller 102 of FIG. 1, or controller 302 of FIG. 3. Network 404 may be an example of network 104 of FIG. 1. First switch 406a or second switch 406b may be respective examples of switch 106 of FIG. 1, or switch 306 of FIG. 3. Ports 408 (first port 408a, second port 408b, third port 408c, fourth port 408d, fifth port 408e, and sixth port 408f may be referred to herein collectively as "ports 408") may be respective examples of one of ports 108 of FIG. 1. Sensors 410 (first sensor 410a, second sensor 410b, third sensor 410c, fourth sensor 410d, fifth sensor 410e, and sixth sensor 410f may be referred to collectively as "sensors 410") may be respective examples of one of sensors 110 of FIG. 1, or sensor 310 of FIG. 3.

The first offset value may be a duration of the first switch-associated cycle time divided by a number of ports (e.g., used ports or total ports) of first switch 406a. Controller 402 may determine the first offset value and may provide the first offset value to first sensor 410a, second sensor 410b, third sensor 410c, and fourth sensor 410d.

The first port number may be a number of first port 408a. Switch 406a may provide the first port number to first sensor 410a.

In various non-limiting examples, first sensor 410a may determine the first time slot based on the first offset value and the first port number. As a non-limiting example, the first time slot may be determined based on a product of the first offset value and a number based on the first port number.

System 400 may include a second sensor 410*b*, which second sensor 410*b* may be communicatively coupled to second port 408*b* of first switch 406*a*. Second sensor 410*b* may provide a second frame 412*b* to the first switch 406*a* at a determined second time slot of the first switch-associated cycle time. The second time slot may be at least partially responsive to the first offset value and a second port number (e.g., a port number of second port 408*b*). The second port number may be a number of second port 408*b* of first switch 406*a*. Switch 406*a* may provide the second port number to second sensor 410*b*. In various non-limiting examples, second sensor 410*b* may determine the second time slot based on the first offset value and the second port number.

System 400 may include second switch 406*b*, which second switch 406*b* may be communicatively coupled to the controller 402. System 400 may include fifth sensor 410*e* (fifth sensor 410*e* may be alternatively referred to herein as a second sensor 410*e*). Fifth sensor 410*e* may be communicatively coupled to the second switch 406*b*. Fifth sensor 410*e* may provide a fifth frame 412*e* (fifth frame 412*e* may be alternatively referred to herein as second frame 412*e*) to second switch 406*b* at a determined second time slot of a second switch-associated cycle time. The second time slot may be at least partially responsive to a second offset value and a second port number.

The second offset value may be a duration of the second switch-associated cycle time divided by a number of ports (e.g., used ports or total ports) of second switch 406*b*. Controller 402 may determine the second offset value and may provide the second offset value to fifth sensor 410*e* and sixth sensor 410*f*. Controller 402 may determine the duration of the second switch-associated cycle time (and the duration of the first switch-associated cycle time) based on device cycles of sensors 410 coupled to switch 406*a* and switch 406*b* respectively. The duration of the first switch-associated cycle time and the duration of the second switch-associated cycle time may or may not be the same. The duration of the first switch-associated cycle time and the duration of the second switch-associated cycle time may be respectively determined based on the shortest device cycle of the respectively attached sensors. For example, the first switch-associated cycle time may be determined based on the shortest device cycle time of first sensor 410*a*, second sensor 410*b*, third sensor 410*c*, and fourth sensor 410*d* and the second switch-associated cycle time may be determined based on the shortest device cycle of fifth sensor 410*e*, and sixth sensor 410*f*.

The third port number may be a number of port 408*e*. Switch 406*b* may provide the third port number to fifth sensor 410*e*.

In various non-limiting examples, fifth sensor 410*e* may determine the third time slot based on the second offset value and the third port number. As a non-limiting example, the third time slot may be determined based on a product of the second offset value and a number based on the third port number.

Figure 5:
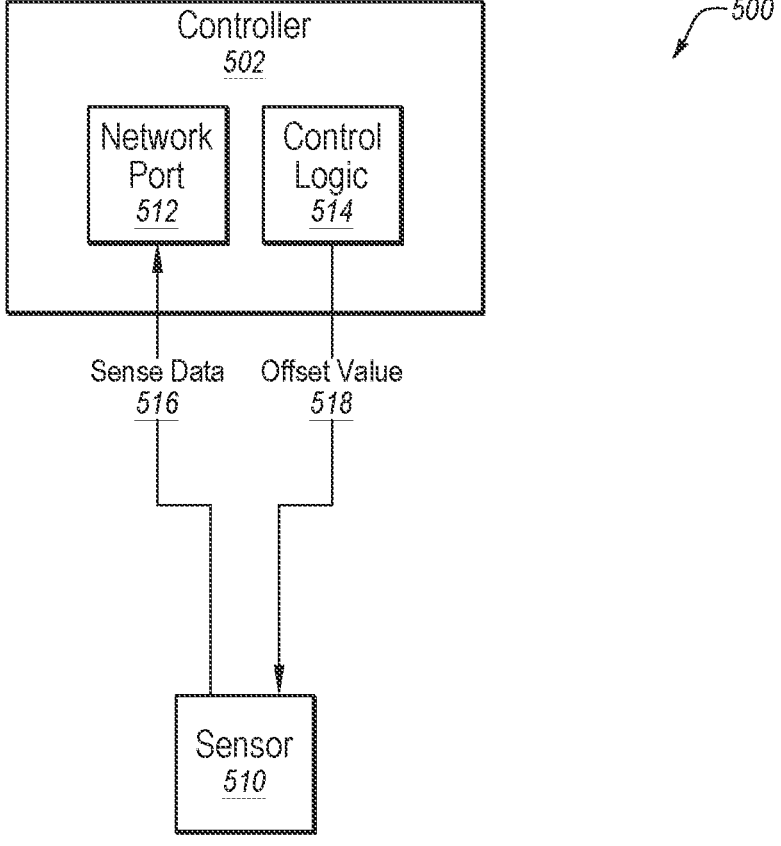
FIG. 5 is a functional block diagram illustrating a system 500 including a controller 502 according to one or more examples.

FIG. 5 is a functional block diagram illustrating a system 500 including a controller 502 according to one or more examples. Controller 502 may operate such that sensors may provide frames at time slots that do not overlap one with another.

Controller 502 may include a network port 512 to communicatively couple controller 502 to a sensor 510 to receive sense data from sensor 510. Controller 502 may include control logic 514 to transmit an offset value 518 to sensor 510. Sensor 510 may schedule transmission of sense data 516 at least partially responsive to offset value 518.

Controller 502 may be an example of any of controller 102 of FIG. 1, controller 302 of FIG. 3, and controller 402 of FIG. 4. Sensor 510 may be an example of any of sensors 110 of FIG. 1, sensor 310 of FIG. 3, and sensors 410 of FIG. 4.

Figure 6:
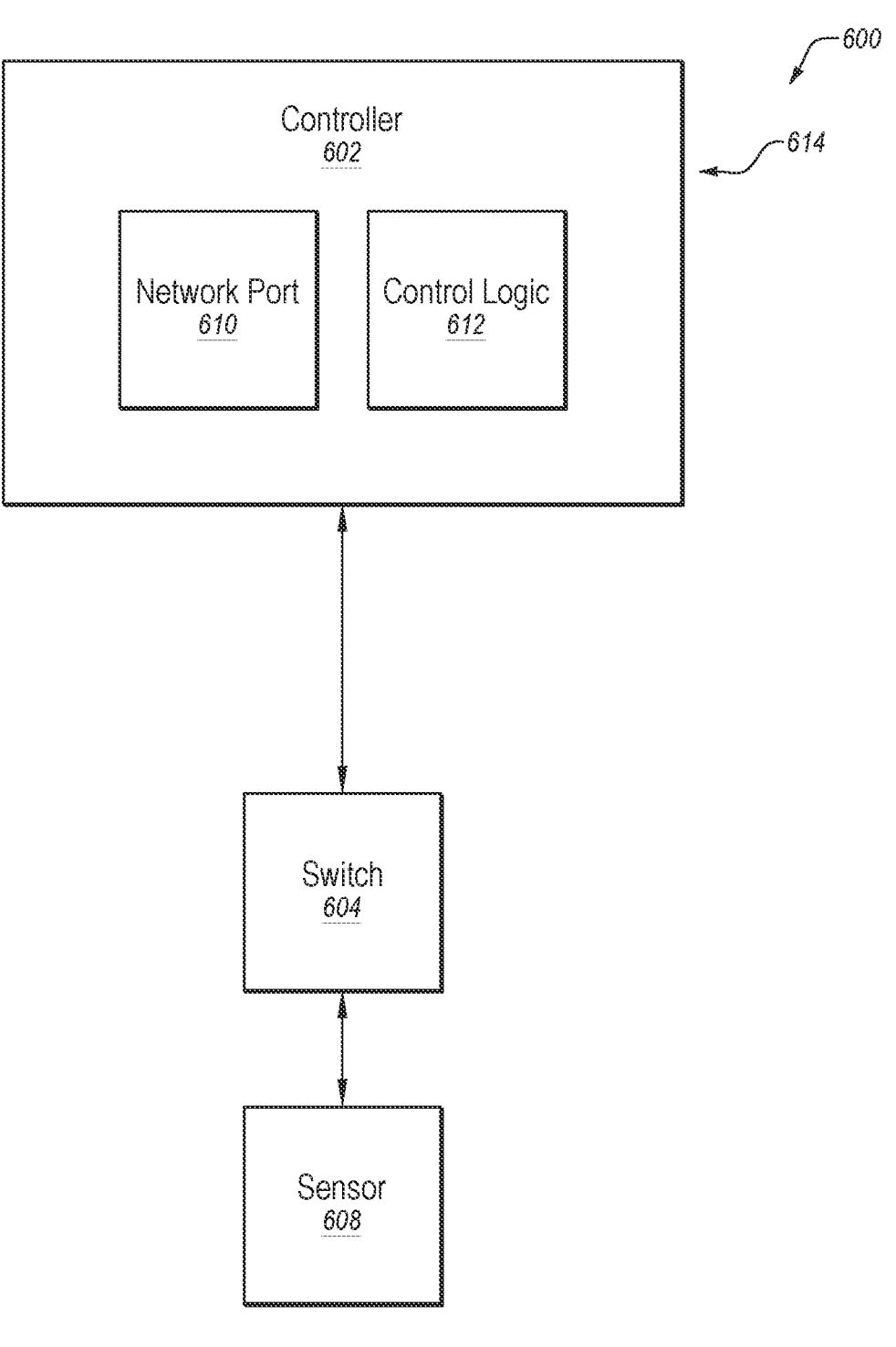
FIG. 6 is a functional block diagram illustrating a system according to one or more examples.

FIG. 6 is a functional block diagram illustrating a system 600 according to one or more examples. System 600, or various elements thereof, may operate such that sensors may provide frames at time slots that do not overlap one with another.

System 600 may include a controller 602. Controller 602 may be an example of any of controller 102 of FIG. 1, controller 302 of FIG. 3, and controller 402 of FIG. 4, or controller 502 of FIG. 5. Controller 602 may include a network port 610 to communicatively couple controller 602 to a sensor 608 to receive sense data from sensor 608. Controller 602 may include control logic 612 to transmit an offset value to sensor 608. Sensor 608 may schedule transmission of sense data at least partially responsive to the transmitted offset value.

Controller 602 may be communicatively coupled to sensor 608 in an asynchronous control network 614. Controller 602 may be communicatively coupled to sensor 608 via a switch 604. Controller 602 may determine the offset value at least partially responsive to a number of used ports of switch 604. Controller 602 may determine the offset value at least partially responsive to a duration of a switch-associated cycle time. Controller 602 may transmit a timing signal to sensor 608 at network port 610.

Figure 7:
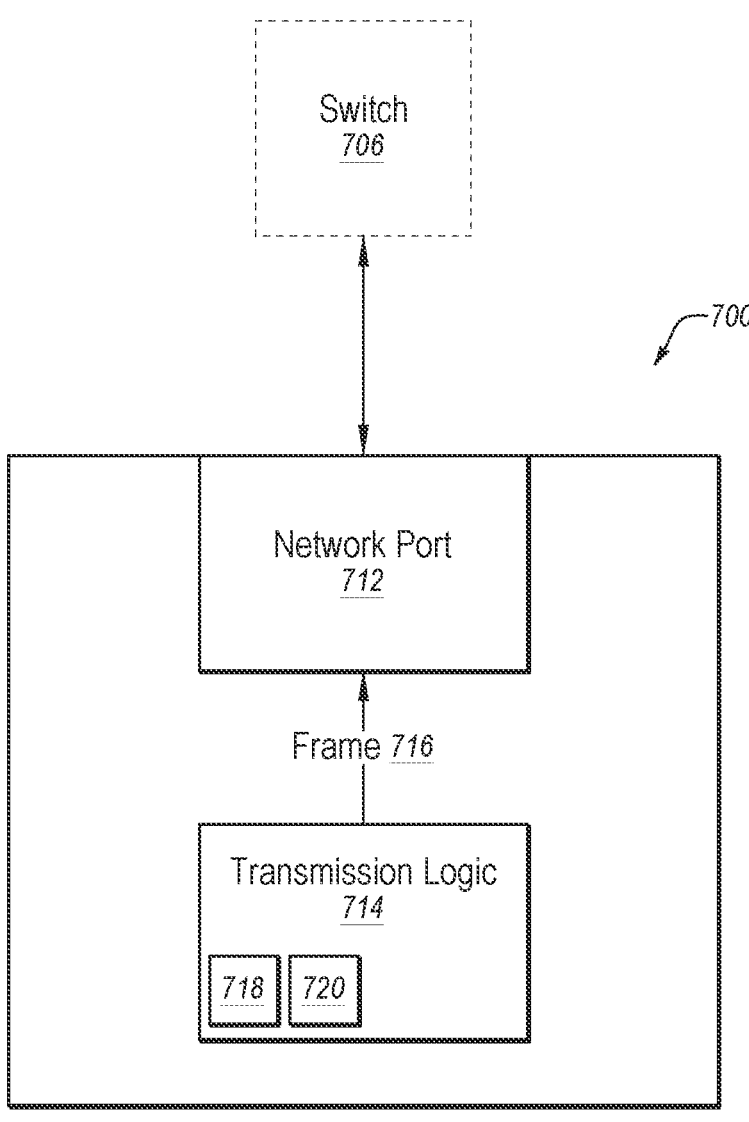
FIG. 7 is a functional block diagram illustrating an apparatus according to one or more examples.

FIG. 7 is a functional block diagram illustrating an apparatus 700 according to one or more examples. Apparatus 700 may operate such that apparatus 700 provides frames at time slots that do not overlap with other time slots during which other devices provide frames.

Apparatus 700 may include a network port 712, which network port 712 may directly couple apparatus 700 to a switch 706. Apparatus 700 may include a transmission logic 714, which transmission logic 714 may provide a frame 716 at network port 712 at a time slot of a switch-associated cycle time. Transmission logic 714 may provide frame 716 at the time slot at least partially responsive to both an offset value 718 and a port number 720. Offset value 718 may represent a fraction of a switch-associated cycle time. Port number 720 may be indicative of a port of switch 706 to which apparatus 700 is directly coupled. For example, transmission logic 714 may provide frame 716 at a time that is a product of offset value 718 and port number 720.

Apparatus 700 may be an example of any of sensors 110 of FIG. 1, sensor 310 of FIG. 3, sensors 410 of FIG. 4, sensor 510 of FIG. 5, and sensor 608 of FIG. 6. Switch 706 may be optional. The optionality of switch 706 is illustrated by switch 706 being illustrated using dashed lines.

Figure 8:
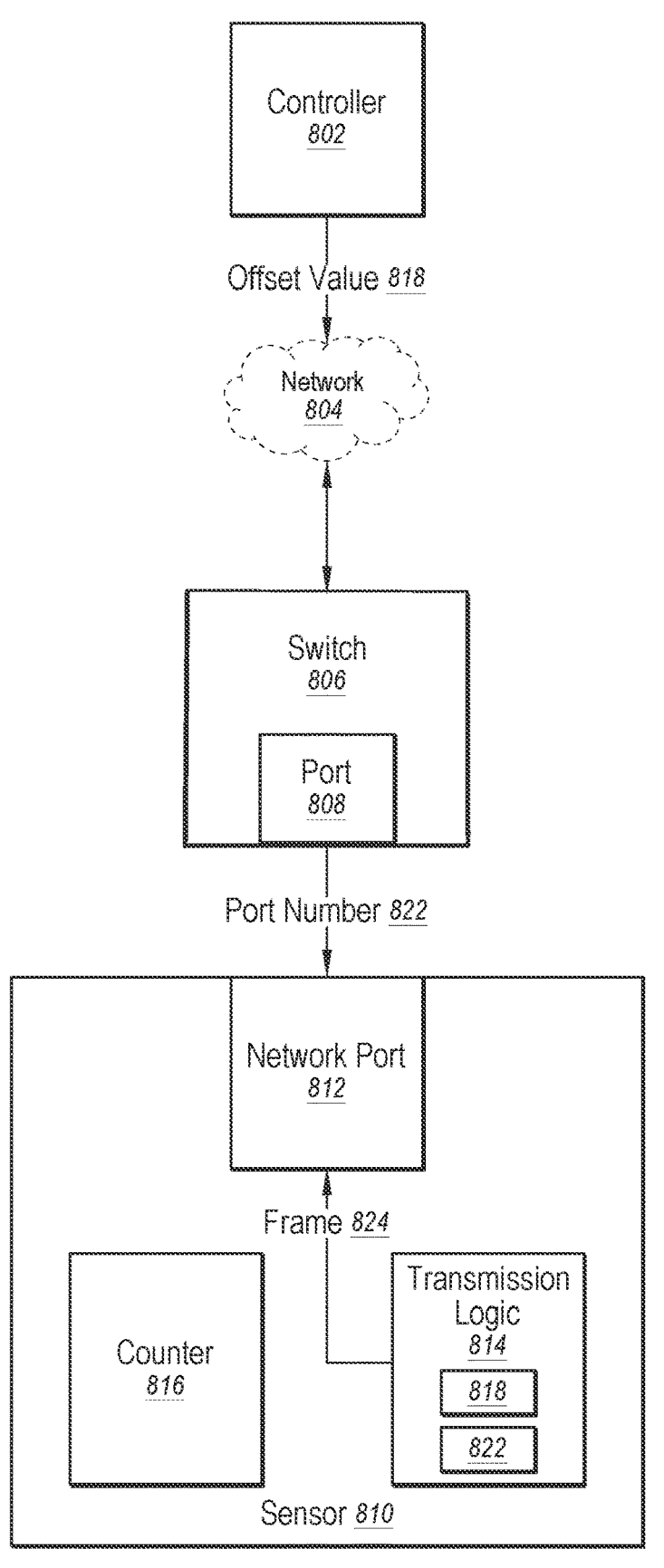
FIG. 8 is a functional block diagram illustrating a system according to one or more examples.

FIG. 8 is a functional block diagram illustrating a system 800 according to one or more examples. System 800, or various elements thereof, may operate such that sensors may provide frames at time slots that do not overlap one with another.

System 800 may include a sensor 810. Sensor 810 may be an example of any of sensors 110 of FIG. 1, sensor 310 of FIG. 3, sensors 410 of FIG. 4, sensor 510 of FIG. 5, sensor 608 of FIG. 6 and apparatus 700 of FIG. 7. Sensor 810 may include a network port 812, which network port 812 may directly couple sensor 810 to a switch 806. Sensor 810 may include a transmission logic 814, which transmission logic 814 may provide a frame 824 at network port 812 at a time slot of a switch-associated cycle time. Transmission logic 814 may provide frame 824 at the time slot at least partially responsive to an offset value 818 and a port number 822.

In various non-limiting examples, transmission logic 814 may determine the time slot at least partially responsive to offset value 818 and port number 822.

Transmission logic 814 may receive offset value 818 from a controller 802 (e.g., via a network 804, which network 804 may be optional in system 800). Offset value 818 may be a fraction of the switch-associated cycle time. The fraction may at least partially responsive to a number of used ports of switch 806.

Transmission logic 814 may receive port number 822 from switch 806. Port number 822 may be indicative of a port 808 of switch 806 to which sensor 810 is directly coupled.

Sensor 810 may include a counter 816 to count clock cycles. Transmission logic 814 may determine the time slot at least partially based on the counted clock cycles. Transmission logic 814 may synchronize counter 816 according to a received timing signal, e.g., received from controller 802 (e.g., via network 804), without limitation.

Sensor 810 may be, or may include, a sensor. Frame 824 may include sense data obtained by the sensor.

Figure 9:
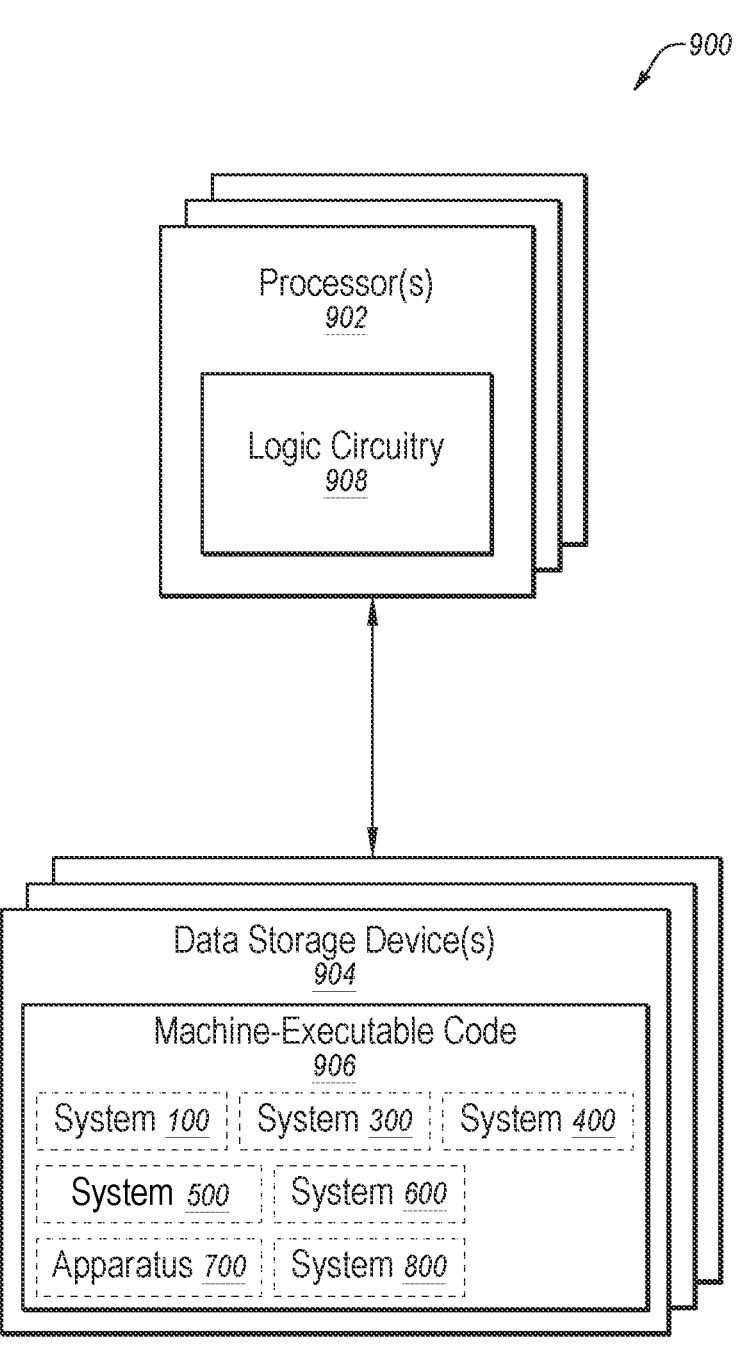
FIG. 9 is a block diagram of a device that, in one or more examples, may be used to implement various functions, operations, acts, processes, or methods disclosed herein.

FIG. 9 is a block diagram of a device 900 that, in one or more examples, may be used to implement various functions, operations, acts, processes, or methods disclosed herein. Device 900 includes one or more processors 902 (sometimes referred to herein as "processors 902") operably coupled to one or more apparatuses such as data storage devices (sometimes referred to herein as "storage 904"), without limitation. Storage 904 includes machine-executable code 906 stored thereon (e.g., stored on a computer-readable memory, without limitation) and processors 902 include logic circuitry 908. Machine-executable code 906 include information describing functional elements that may be implemented by (e.g., performed by, without limitation) logic circuitry 908. Logic circuitry 908 implements (e.g., performs, without limitation) the functional elements described by machine-executable code 906. Device 900, when executing the functional elements described by machine-executable code 906, should be considered special purpose hardware that may carry out the functional elements disclosed herein. In one or more examples, processors 902 may perform the functional elements described by machine-executable code 906 sequentially, concurrently (e.g., on one or more different hardware platforms, without limitation), or in one or more parallel process streams.

When implemented by logic circuitry 908 of processors 902, machine-executable code 906 may adapt processors 902 to perform operations of examples disclosed herein. For example, machine-executable code 906 may adapt processors 902 to perform at least a portion or a totality of operations described with relation to FIG. 1 or FIG. 2. As another example, machine-executable code 906 may adapt processors 902 to perform at least a portion or a totality of the operations discussed for system 100 of FIG. 1 (including controller 102, switch 106, or sensors 110), system 300 of FIG. 3 (including controller 302, switch 306, or sensor 310), system 400 of FIG. 4 (including controller 402, switch 406a, switch 406b, or sensors 410), system 500 of FIG. 5 (including controller 502 (including control logic 514)), system 600 of FIG. 6 (including controller 602 (including control logic 612), switch 604, or sensor 608), apparatus 700 (including transmission logic 714), or system 800 including controller 802, switch 806, or sensor 810 (including transmission logic 814).

Processors 902 may include a general purpose processor, a special purpose processor, a central processing unit (CPU), a microcontroller, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein. A general-purpose computer including a processor is considered a special-purpose computer while the general-purpose computer executes computing instructions (e.g., software code, without limitation) related to examples. It is noted that a general-purpose processor (may also be referred to herein as a host processor or simply a host) may be a microprocessor, but in the alternative, processors 902 may include any conventional processor, controller, microcontroller, or state machine. Processors 902 may also be implemented as a combination of computing devices, such as a combination of a DSP and a microprocessor, a plurality of microprocessors, one or more microprocessors in conjunction with a DSP core, or any other such configuration.

In one or more examples, storage 904 includes volatile data storage (e.g., random-access memory (RAM), without limitation), non-volatile data storage (e.g., Flash memory, a hard disc drive, a solid state drive, erasable programmable read-only memory (EPROM), without limitation). In one or more examples processors 902 and storage 904 may be implemented into a single device (e.g., a semiconductor device product, a system on chip (SOC), without limitation). In one or more examples processors 902 and storage 904 may be implemented into separate devices.

In one or more examples, machine-executable code 906 may include computer-readable instructions (e.g., software code, firmware code, without limitation). By way of non-limiting example, the computer-readable instructions may be stored by storage 904, accessed directly by processors 902, and executed by processors 902 using at least logic circuitry 908. Also by way of non-limiting example, the computer-readable instructions may be stored on storage 904, transmitted to a memory device (not shown) for execution, and executed by processors 902 using at least logic circuitry 908. Accordingly, in one or more examples, logic circuitry 908 includes electrically configurable logic circuitry.

In one or more examples, machine-executable code 906 may describe hardware (e.g., circuitry, without limitation) to be implemented in logic circuitry 908 to perform the functional elements. This hardware may be described at any of a variety of levels of abstraction, from low-level transistor layouts to high-level description languages. At a high-level of abstraction, a hardware description language (HDL) such as an Institute of Electrical and Electronics Engineers (IEEE) Standard hardware description language (HDL) may be used, without limitation. By way of non-limiting examples, VERILOG™, SYSTEMVERILOG™ or very large scale integration (VLSI) hardware description language (VHDL™) may be used.

HDL descriptions may be converted into descriptions at any of numerous other levels of abstraction as desired. As a non-limiting example, a high-level description can be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of logic circuitry 908 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in one or more examples machine-executable code 906 may include an HDL, an RTL, a GL description, a mask level description, other hardware description, or any combination thereof.

In examples where machine-executable code 906 includes a hardware description (at any level of abstraction), a system (not shown, but including storage 904) may implement the hardware description described by machine-executable code 906. By way of non-limiting example, processors 902 may include a programmable logic device (e.g., an FPGA or a PLC, without limitation) and the logic circuitry 908 may be electrically controlled to implement circuitry corresponding to the hardware description into logic circuitry 908. Also by way of non-limiting example, logic circuitry 908 may include hard-wired logic manufactured by a manufacturing system (not shown, but including storage 904) according to the hardware description of machine-executable code 906.

Regardless of whether machine-executable code 906 includes computer-readable instructions or a hardware description, logic circuitry 908 performs the functional elements described by machine-executable code 906 when implementing the functional elements of machine-executable code 906. It is noted that although a hardware description may not directly describe functional elements, a hardware description indirectly describes functional elements that the hardware elements described by the hardware description are capable of performing.

As used herein, the term "substantially" in reference to a given parameter, property, or condition means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, or even at least about 99% met.

As used in the present disclosure, the terms "module" or "component" may refer to specific hardware implementations that may perform the actions of the module or component or software objects or software routines that may be stored on or executed by general purpose hardware (e.g., computer-readable media, processing devices, without limitation) of the computing system. In one or more examples, the different components, modules, engines, and services described in the present disclosure may be implemented as objects or processes that execute on the computing system (e.g., as separate threads, without limitation). While some of the systems and methods described in the present disclosure are generally described as being implemented in software (stored on or executed by general purpose hardware), specific hardware implementations or a combination of software and specific hardware implementations are also possible and contemplated.

As used in the present disclosure, the term "combination" with reference to a plurality of elements may include a combination of all the elements or any of various different sub-combinations of some of the elements. For example, the phrase "A, B, C, D, or combinations thereof" may refer to any one of A, B, C, or D; the combination of each of A, B, C, and D; and any sub-combination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," without limitation). As used herein, "each" means "some or a totality." As used herein, "each and every" means "a totality."

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, without limitation" or "one or more of A, B, and C, without limitation" is used, in general such a construction is intended to include A alone, B alone, C alone, A and B together, A and C together, B and C together, or A, B, and C together, without limitation.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additional non-limiting examples of the disclosure may include:

Example 1: An apparatus, comprising: a network port to directly couple the apparatus to a switch; and a transmission logic to provide a frame at the network port at a time slot of a switch-associated cycle time, the transmission logic to provide the frame at the time slot at least partially responsive to an offset value and a port number.

Example 2: The apparatus according to Example 1, wherein the transmission logic to receive the offset value from a controller.

Example 3: The apparatus according to any of Examples 1 and 2, wherein the offset value is a fraction of the switch-associated cycle time.

Example 4: The apparatus according to any of Examples 1 through 3, wherein the fraction is at least partially responsive to a number of used ports of the switch or a number of total ports of the switch.

Example 5: The apparatus according to any of Examples 1 through 4, wherein the transmission logic to receive the port number from the switch.

Example 6: The apparatus according to any of Examples 1 through 5, wherein the port number is indicative of a port of the switch to which the apparatus is directly coupled.

Example 7: The apparatus according to any of Examples 1 through 6 comprising a counter to count clock cycles, wherein the transmission logic to determine the time slot at least partially based on the counted clock cycles.

Example 8: The apparatus according to any of Examples 1 through 7, wherein the transmission logic to synchronize the counter according to a received timing signal.

Example 9: The apparatus according to any of Examples 1 through 8, wherein the apparatus comprises a sensor and wherein the frame includes sense data, the sense data obtained by the sensor.

Example 10: A controller comprising: a network port to communicatively couple the controller to a sensor to receive sense data from the sensor; and a control logic to transmit an offset value to the sensor, the sensor to schedule transmission of sense data at least partially responsive to the offset value.

Example 11: The controller according to Example 10, wherein the controller to be communicatively coupled to the sensor in an asynchronous control network.

Example 12: The controller according to any of Examples 10 and 11, wherein the controller to be communicatively coupled to the sensor via a switch and wherein the controller to determine the offset value at least partially responsive to a number of used ports of the switch or a number of total ports of the switch.

Example 13: The controller according to any of Examples 10 through 12, wherein the controller to determine the offset value at least partially responsive to a duration of a switch-associated cycle time.

Example 14: The controller according to any of Examples 10 through 13, wherein the controller to be communicatively coupled to the sensor via a switch, wherein the switch is communicatively coupled to sensors including the sensor, and wherein the controller to determine the offset value at least partially responsive to respective device cycles of the sensors.

Example 15: The controller according to any of Examples 10 through 14, wherein the controller to transmit a timing signal to the sensor at the network port.

Example 16: A system comprising: a controller; a first switch communicatively coupled to the controller, the first switch comprising a first port; and a first sensor communicatively coupled to the first port of the first switch, the first sensor to provide a first frame to the first switch at a first time slot of a first switch-associated cycle time, the first time slot at least partially responsive to a first offset value and a first port number.

Example 17: The system according to Example 16, wherein the first switch to transmit the first port number to the first sensor, the first port number related to the first port.

Example 18: The system according to any of Examples 16 and 17, comprising a second sensor communicatively coupled to a second port of the first switch, the second sensor to provide a second frame to the first switch at a second time slot of the first switch-associated cycle time, the second time slot at least partially responsive to the first offset value and a second port number.

Example 19: The system according to any of Examples 16 through 18, wherein the first switch to transmit the second port number to the second sensor, the second port number related to the second port.

Example 20: The system according to any of Examples 16 through 19, comprising: a second switch communicatively coupled to the controller; and a second sensor communicatively coupled to the second switch, the second sensor to provide a second frame to the second switch at a second time slot of a second switch-associated cycle time, the second time slot at least partially responsive to a second offset value and a second port number.

Example 21: The system according to any of Examples 16 through 20, wherein the controller to determine the first offset value at least partially responsive to a number of used ports of the first switch or a number of total ports of the first switch and wherein the controller to determine the second offset value at least partially responsive to a number of used ports of the second switch or a number of total ports of the second switch.

Example 22: The system according to any of Examples 16 through 21, wherein the first switch is communicatively coupled to first sensors, including the first sensor, wherein the second switch is communicatively coupled to second sensors, including the second sensor, wherein the controller to determine a duration of the first switch-associated cycle time at least partially responsive to a shortest device cycle of the first sensors, and wherein the controller to determine a duration of the second switch-associated cycle time at least partially responsive to a shortest device cycle of the second sensors.

Example 23: The system according to any of Examples 16 through 22, wherein the duration of the first switch-associated cycle time and the duration of the second switch-associated cycle time are the same.

While the present disclosure has been described with respect to certain illustrated examples, those of ordinary skill in the art will recognize and appreciate that the present invention is not so limited. Rather, many additions, deletions, and modifications to the illustrated and described examples may be made without departing from the scope of the invention as hereinafter claimed along with their legal equivalents. In addition, features from one example may be combined with features of another example while still being encompassed within the scope of the invention as contemplated by the inventor.

What is claimed is:

1. An apparatus, comprising:
a network port to directly couple the apparatus to a switch; and
a transmission logic to provide a frame at the network port at a time slot of a switch-associated cycle time, the time slot determined based, at least in part, on an offset value and a port number,
wherein the offset value is a fraction of the switch-associated cycle time, and
wherein the fraction is at least partially responsive to a number of used ports of the switch or a number of total ports of the switch.

2. The apparatus of claim 1, wherein the transmission logic to receive the offset value from a controller.

3. The apparatus of claim 1, wherein the transmission logic to receive the port number from the switch.

4. The apparatus of claim 3, wherein the port number is indicative of a port of the switch to which the apparatus is directly coupled.

5. An apparatus, comprising:
a network port to directly couple the apparatus to a switch;
a transmission logic to provide a frame at the network port at a time slot of a switch-associated cycle time, the time slot determined based, at least in part, on an offset value and a port number; and a counter to count clock cycles, wherein the transmission logic to determine the time slot at least partially based on the counted clock cycles.

6. The apparatus of claim 5, wherein the transmission logic to synchronize the counter according to a received timing signal.

7. The apparatus of claim 5, wherein the apparatus comprises a sensor and wherein the frame includes sense data, the sense data obtained by the sensor.

8. A controller comprising:

a network port to communicatively couple the controller to a sensor to receive sense data from the sensor; and a control logic to transmit an offset value to the sensor, the sensor to schedule transmission of sense data at least partially responsive to the offset value, wherein the offset value is a fraction of the switch-associated cycle time, and wherein the controller to be communicatively coupled to the sensor via a switch and wherein the controller to determine the offset value at least partially responsive to a number of used ports of the switch or a number of total ports of the switch.

9. The controller of claim 8, wherein the controller to be communicatively coupled to the sensor in an asynchronous control network.

10. The controller of claim 9, wherein the controller to transmit a timing signal to the sensor at the network port.

11. The controller of claim 8, wherein the controller to determine the offset value at least partially responsive to a duration of a switch-associated cycle time.

12. The controller of claim 8, wherein the controller to be communicatively coupled to the sensor via a switch, wherein the switch is communicatively coupled to sensors including the sensor, and wherein the controller to determine the offset value at least partially responsive to respective device cycles of the sensors.

13. A system comprising:

a controller;

a first switch communicatively coupled to the controller, the first switch comprising a first port;

a first sensor communicatively coupled to the first port of the first switch, the first sensor to provide a first frame to the first switch at a first time slot of a first switch-associated cycle time, the first time slot determined based, at least in part, on a first offset value and a first port number, wherein the first switch to transmit the first port number to the first sensor, the first port number related to the first port; and a second sensor communicatively coupled to a second port of the first switch, the second sensor to provide a second frame to the first switch at a second time slot of the first switch-associated cycle time, the second time slot at least partially responsive to the first offset value and a second port number.

14. The system of claim 13, wherein the first switch to transmit the second port number to the second sensor, the second port number related to the second port.

15. A system comprising:

a controller;

a first switch communicatively coupled to the controller, the first switch comprising a first port;

a first sensor communicatively coupled to the first port of the first switch, the first sensor to provide a first frame to the first switch at a first time slot of a first switch-associated cycle time, the first time slot determined based, at least in part, on a first offset value and a first port number, a second switch communicatively coupled to the controller; and a second sensor communicatively coupled to the second switch, the second sensor to provide a second frame to the second switch at a second time slot of a second switch-associated cycle time, the second time slot at least partially responsive to a second offset value and a second port number.

16. The system of claim 15, wherein the controller to determine the first offset value at least partially responsive to a number of used ports of the first switch or a number of total ports of the first switch and wherein the controller to determine the second offset value at least partially responsive to a number of used ports of the second switch or a number of total ports of the second switch.

17. The system of claim 15, wherein the first switch is communicatively coupled to first sensors, including the first sensor, wherein the second switch is communicatively coupled to second sensors, including the second sensor, wherein the controller to determine a duration of the first switch-associated cycle time at least partially responsive to a shortest device cycle of the first sensors, and wherein the controller to determine a duration of the second switch-associated cycle time at least partially responsive to a shortest device cycle of the second sensors.

18. The system of claim 17, wherein the duration of the first switch-associated cycle time and the duration of the second switch-associated cycle time are the same.

* * * * *